Jan. 27, 1970     M. WALDMAN     3,492,058
DETECTOR LENS ASSEMBLY
Filed Feb. 3, 1967
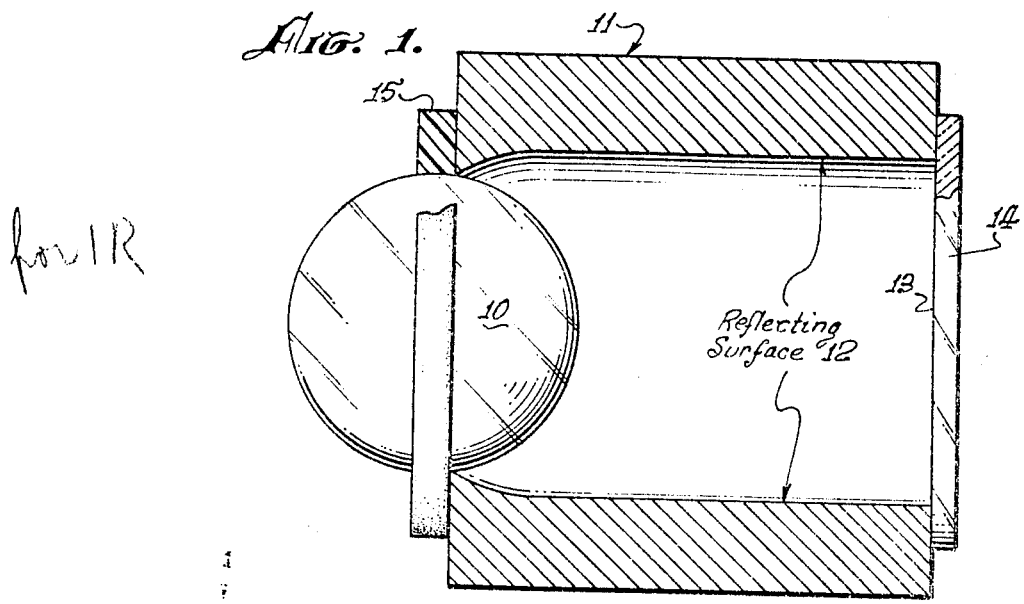
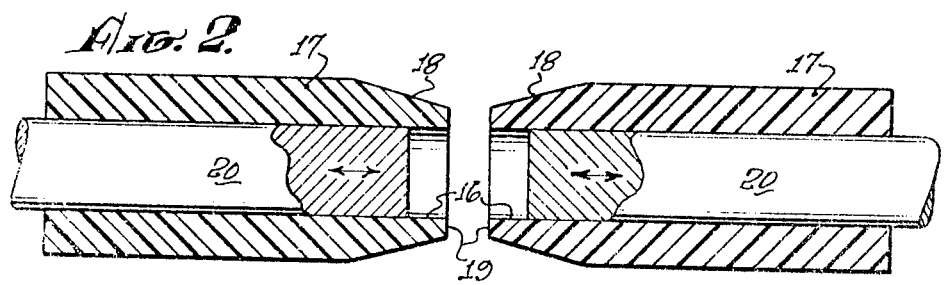
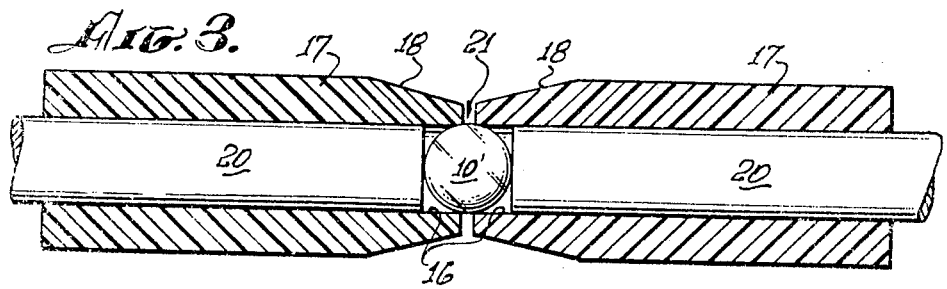
INVENTOR.
MARVIN WALDMAN,
BY  L.E.Carnahan
AGENT.

United States Patent Office 3,492,058
Patented Jan. 27, 1970

3,492,058
DETECTOR LENS ASSEMBLY
Marvin Waldman, Ontario, Calif., assignor to General Dynamics Corporation, Pomona, Calif., a corporation of Delaware
Filed Feb. 3, 1967, Ser. No. 613,916
Int. Cl. G02b 3/00
U.S. Cl. 350—2                                     1 Claim

ABSTRACT OF THE DISCLOSURE

This disclosure relates to a lens or window assembly for a cooled infrared detector unit and a molding method and apparatus for forming a washer-like collar thereon. The dewar window is formed of a solid optical material formed as a spherical element which is placed in position in the end of the reflecting cylinder of the detector and held in place by a thin support collar element formed from a non-metallic material, the collar being cemented to the transverse face of the reflecting cylinder. This arrangement permits very close control of the amount of incident rays which are prevented from entering the detector unit by the lens or window end mounting arrangement. The collar is produced from a mold formed by drilling holes through Teflon rod blanks and thereafter tapering the ends of the hollow rods. Inserted into the drill bores are metal rods so as to form respective mold halves each consisting of the hollow rod having the metal rod positioned therein. The mold halves are then positioned in opposing relationship and the metal rods and axially adjusted to a degree required to engage a sphere disposed therebetween, and the hollow rods are positioned such that there remains a slight gap therebetween. Into this gap is poured a suitable molding material, and after hardening the mold halves are removed so as to form a collar upon the sphere. The Teflon serves to facilitate removal of the mold halves from the formed part.

BACKGROUND OF THE INVENTION

The present invention relates to infrared detectors, and more particularly to a lens assembly for infrared detectors and to a tool for fabricating the lens assembly.

The application of infrared to airborne fire control systems is being rapidly expanded, and infrared detectors are now being designed to replace the radar gear in certain military aircraft. Infrared equipment is finding increased use as it has many advantages over other types of fire control equipment. While present-day infrared detectors have many advantages, one disadvantage is in the manner in which the lens or window is mounted therein. This disadvantage is overcome by the present invention wherein the window or lens is held in place by a collar which is so constructed to provide control of the amount of surface of the lens occupied by the attachment which is closed to light transmission.

SUMMARY OF THE INVENTION

Therefore, it is an object of this invention to provide a lens assembly utilizing a spherical lens.

A further object of the invention is to provide a tool for forming a holding collar means on a sphere.

Another object of the invention is to provide a lens assembly for an infrared detector.

Another object of the invention is to provide a lens assembly for an infrared detector utilizing a lens of solid spherical optical material retained by a support collar of non-metallic material.

Other objects of the invention, not specifically set forth above, will become readily apparent from the following description and accompanying drawings wherein:

BRIEF DESCRIPTION OF DRAWINGS

FIG. 1 is a view partially in cross section of an embodiment of a lens assembly made in accordance with the invention; and FIGS. 2 and 3 are cross-sectional views illustrating an embodiment of the tool and its application in accordance with the invention.

DESCRIPTION OF THE EMBODIMENT

Referring now to the drawings, FIG. 1 illustrates a lens assembly of an infrared detector unit wherein the dewar window consists of a solid sphere 10 constructed of optical material, as known in the art, for the purpose of receiving and transmitting light into a reflecting cylinder or cone 11 wherein it is led by the reflecting surface 12 thereof to a detector attached at the rear opening 13 of the cylinder or cone 11 via, for example, a quartz cooled cutoff filter and detector substrate indicated at 14. The window or sphere 10 is held in place by a support collar 15. The collar 15 permits a very close control of the amount of surface of the sphere 10 occupied by the attachment and therefore closed to light transmission. By using the collar 15, the surface of the sphere 10 does not require grooving to mount a clamping device to hold the sphere. The support collar method of holding the sphere window, as described hereinafter, also makes a metal holder unnecessary. To assemble the window or sphere 10, with the collar attached thereto, place the sphere in the cylinder, center it, and cement or otherwise secure the collar 15 to the cylinder surface. It is thus seen that the collar 15 permits very close control of the amount of surface of the sphere 10 occupied by the attachment thereof to the sphere and cylinder.

The mold tool as shown in FIGS. 2 and 3 is used to mold the thin washer-like collar 15 of FIG. 1 around the diameter of a sphere 10'. A passageway or bore 16, smaller than the diameter of the sphere 10', for example 0.001 to 0.002 inch smaller, is drilled in each of a pair of rods or blanks 17 constructed of Teflon or other suitable material. Then, one end of each mold or rod 17 is tapered at 18 to provide a surface 19 which is of the same height as the outside diameter of the collar required, and may, for example, be 0.015 inch across. A metal rod 20 is inserted in each of the bores 16 of Teflon mold halves or rods 17. The metal rods 20 may be slightly larger in diameter than the bores 16 to provide a tight fit, for example 0.001 or 0.002 inch larger than the bore. The rods 20 should be positioned one-half the diameter of the sphere 10' being used plus one-half the thickness of the support collar desired from the surfaces 19 of the mold halves or rods 17.

FIG. 3 shows the sphere 10' inserted in the mold tool wherein the mold (elements 17 and 20) holds the sphere tightly in place with the two halves in place around the sphere wherein a gap 21 is formed. The gap, for example, may be 0.008 inch across with 0.004 inch on both sides of the center of the sphere 10'. This gap 21 is filled with epoxy or other adhesive material and allowed to harden and dry. After the epoxy has hardened, the mold is taken apart, allowing the sphere 10' with its support collar (see collar 15 of FIG. 1) to be easily removed. The technique described above, by way of example, is applicable for supporting spheres of diameters less than 0.250 inch. The Teflon construction of the mold elements 17 serves to facilitate removal of the mold halves from the formed part.

With the lens assembly described above, the distance from the window or sphere to the detector is not critical, thereby doing away with the light tolerances on detector longitudinal positioning. It also provides a better thermal barrier for a dewar system. The detector, while known in the art, is not shown in detail, may be deposited between flat plates, thus making more feasible the use of a dual detector system and the use of cooled filters.

The advantages of the above-described invention are as follows:

(1) The sphere or window is an off-the-shaft item at a nominal cost.

(2) The collar permits very close control of the amount of the surface of the sphere (window) occupied by the attachment.

(3) Distance from the window to the detector is not critical.

(4) Air gap between the window or detector provides a thermal barrier and may be, for example, 0.080 inch.

(5) The detector is deposited between flat plates, thus making feasible the use of a dual detector system and the use of cooled filters.

(6) The dimensions of the collar can be closely controlled by the use of the collar mold tool.

(7) By making the bores in the two halves of the mold tool slightly smaller than the diameter of the sphere, the sphere is caused to seal tightly, preventing the epoxy from seeping around the gap (to be filled) onto the clear surface of the spherical window.

(8) The collar mold tool is simple and inexpensive.

What I claim is:

1. A detector lens assembly for receiving and transmitting infrared energy comprising a cylindrical hollow housing having a substantially cylindrical reflective surface on the interior thereof for reflecting infrared energy, said housing additionally having a first open-end portion and a second open-end portion, said first open-end portion of said housing having a smaller diameter than the diameter of said substantially cylindrical reflective surface, said reflective surface having a converging diameter portion arcuately extending between said first open-end portion and the larger diameter of said reflective surface, a solid spherical optical lens mounted partially within said first open-end portion of said housing for receiving infrared enregy and transmitting infrared energy therethrough and to said reflective surface, a transverse area defining the surface of said first open-end portion of said housing, a thin non-metallic annular collar tightly encompassing said optical lens, said collar being fixedly attached to said surface of said first open-end portion of said housing for maintaining said optical lens in secure relationship with said housing; a second transverse area defining the surface of said second open-end portion of said housing, and an infrared detector fixedly attached to said surface of said second open-end portion of said housing and completely covering the opening of said second open-end portion, said infrared detector being adapted to receive infrared energy from said optical lens and said reflective surface.

References Cited

UNITED STATES PATENTS

| | | | |
|---|---|---|---|
| 2,788,708 | 4/1957 | Williamson | 350—202 |
| 3,157,089 | 11/1964 | Menefee | 350—96 X |
| 3,162,045 | 12/1964 | Kudelko | 250—83 X |
| 2,155,093 | 4/1939 | Kaplowitz | 350—252 |
| 3,020,542 | 2/1962 | Johnston | 350—293 |
| 3,138,650 | 6/1964 | Andrychuk | 350—293 |
| 3,244,776 | 4/1966 | Sheldon | 350—96 |

DAVID SCHONBERG, Primary Examiner

A. OSTRAGER, Assistant Examiner

U.S. Cl. X.R.

250—83; 350—175, 252